United States Patent
Al-Attas et al.

(10) Patent No.: US 7,725,489 B2
(45) Date of Patent: May 25, 2010

(54) NODE FOR PROVIDING A FILE SERVICE TO A MOBILE TERMINAL

(75) Inventors: Sami Hussain Salem Al-Attas, Jeddah (SA); Ashraf Hassan Kamel, Jeddah (SA); Maummer Mustafa Alireza, Jeddah (SA); Samy Khalil Abushanab, Jeddah (SA)

(73) Assignee: Noryan Holding Corporation, Tortola (VG)

( * ) Notice: Subject to any disclaimer, the term of this patent is extended or adjusted under 35 U.S.C. 154(b) by 305 days.

(21) Appl. No.: 11/700,494

(22) Filed: Jan. 31, 2007

(65) Prior Publication Data

US 2008/0183713 A1    Jul. 31, 2008

(51) Int. Cl.
  *G06F 17/30*    (2006.01)
(52) U.S. Cl. .................. 707/781; 707/783; 707/784; 707/785
(58) Field of Classification Search .......... 707/1–9, 707/781, 783–785; 709/223–224
  See application file for complete search history.

(56) References Cited

U.S. PATENT DOCUMENTS 6,389,420 B1 * 5/2002 Vahalia et al. ............. 707/8
2004/0122958 A1 * 6/2004 Wardrop .................... 709/229
2005/0027995 A1   2/2005 Menschik
2005/0091316 A1   4/2005 Ponce et al.
2005/0234864 A1 * 10/2005 Shapiro ..................... 707/1
2005/0283649 A1 * 12/2005 Turner et al. .............. 714/6
2007/0028068 A1 * 2/2007 Golding et al. ........... 711/170
2008/0176560 A1   7/2008 Dutta

FOREIGN PATENT DOCUMENTS

| EP | 1 457 890 A | 9/2004 |
| EP | 1 513 080 A | 3/2005 |
| WO | 99/38099 A | 7/1999 |
| WO | 2004/052026 A | 6/2004 |

* cited by examiner

*Primary Examiner*—Don Wong
*Assistant Examiner*—Hanh B Thai
(74) *Attorney, Agent, or Firm*—Stroock & Stroock & Lavan LLP

(57) ABSTRACT

A node for providing a file service to a mobile terminal, the node comprises mobile terminal interface, and a file system for a plurality of users, each user having a user folder. The node is configured, in response to receiving a request for file access from a mobile terminal, to identify a user folder, to determine whether the file managing system manages the user folder and, in dependence upon whether the file managing system manages the user folder, to retrieve an entry point for the user folder and to transmit the entry point to the mobile terminal.

17 Claims, 9 Drawing Sheets

NODE FOR PROVIDING A FILE SERVICE TO A MOBILE TERMINAL

FIELD OF THE INVENTION

The present invention relates to a node for providing a file service to a mobile terminal, particularly, but not exclusively, for use in a Next Generation Network.

BACKGROUND ART

Next Generation Networks (NGNs) allow operators to incorporate voice, video and data services into customised service bundles. Thus, a need arises to provide mobile users with the facility to organise and share files. A need also arises to allow mobile users to access services through local and global networks, regardless of access environment, location and operator.

Existing wireless telecommunication networks allow subscribers to make and receive voice calls using their terminals via a wireless network other than one with which they are registered (usually referred to as a "visited network" and a "home network" respectively). This service is known as "roaming".

Much effort has been directed to providing fast, seamless voice roaming. However, little attention has been paid to the problem of how to allow mobile users to access and share files easily and conveniently. In most cases, mobile users access files located in their home network by accessing a portal via an Internet connection.

The present invention seeks to provide a node for providing a file service to a mobile terminal.

SUMMARY OF THE INVENTION

According to a first aspect of certain embodiments of the present invention there is provided a node for providing a file service to a mobile terminal, the node comprising an interface for interfacing with a mobile terminal, a system for managing files for a plurality of users, each user having a user folder, and at least one processing module configured, in response to receiving a request for file access from a mobile terminal, to identify a user folder, to determine whether the file managing system manages the user folder and, in dependence upon whether the file managing system manages the user folder, to retrieve an entry point for the user folder and to transmit the entry point to the mobile terminal.

Thus, a user can access their files seamlessly through such nodes.

The node may further comprise storage for storing metadata for the file system, wherein the at least one processing module is configured to retrieve the entry point from the metadata.

The at least one processing module may be configured, in response to determining that the file managing system does not manage the user folder, to identify another node which manages the user folder, to request metadata for the user folder from the other node, to receive the metadata from the other node, to retrieve the entry point from the metadata and to transmit the entry point to the mobile terminal. The node may comprise storage for storing metadata, wherein the at least one processing module is configured to store received metadata in the metadata storage for at least a predetermined duration of time.

The at least one processing module may be configured to identify a user from the request and, in dependence upon a user identity, to identify the user folder. The at least one processing module may be configured, in response to receiving a command to grant permission to a second user to access a first user's file or folder, to identify a node managing the second user's user folder and to send a message to the node, the message including metadata for the file or folder.

The node may further comprise storage for storing metadata for the file system, wherein the at least one processing module is configured, in response to receiving a message from another node granting permission to the user to access another user's file or folder and which includes metadata for the file or folder, to stored the metadata in the metadatastorage.

The at least one processing module may be configured to inspect a network identifier provided by the mobile terminal so as to determine whether the file managing system manages the user folder. The entry point may comprise a security identifier. The at least one processing module may be configured, in response to receiving a request for file access from a mobile terminal, to authenticate the mobile terminal.

According to a second aspect of certain embodiments of the present invention there is provided a node for providing a file service to a mobile terminal, the node comprising an interface for interfacing with a mobile terminal, a system for managing files for a plurality of users, each user having a user folder, and at least one processing module configured, in response to receiving a command to grant permission to a second user to access a first user's file or folder, to identify a node managing the second user's user folder and to send a message to the node, the message including metadata for the file or folder.

Thus, a user can share files easily through such nodes.

According to a third aspect of certain embodiments of the present invention there is provided a node for providing a file service to a mobile terminal, the node comprising an interface for interfacing with a mobile terminal, a system for managing files for a plurality of users, each user having a user folder, and at least one processing module configured in response to receiving a message from another node granting permission to a second user to access a first user's file or folder and which includes metadata for the file or folder, to store the metadata in the metadatastorage.

According to a fourth aspect of certain embodiments of the present invention there is provided a system for serving a file comprising the node and storage, remotely located from the node, for storing the files.

According to a fifth aspect of certain embodiments of the present invention there is provided a communications network including the file serving system.

The communications network may include at least one access point configured, in response to receiving a request for connection to a node from a mobile terminal, to return an address for the node to the mobile terminal.

According to a sixth aspect of certain embodiments of the present invention there is provided a method of operating a node for providing a file service to a mobile terminal, the method comprising receiving a request for file access from a mobile terminal, identifying a user folder, determining whether the node manages the user folder, retrieving an entry point for the user folder and transmitting the entry point to the mobile terminal.

The method may further comprise identifying another node which manages the user folder, requesting the metadata for the user folder from the other node, receiving the metadata from the other node, retrieving the entry point from the metadata.

According to a seventh aspect of certain embodiments of the present invention there is provided a method of operating a node for providing a file service to a mobile terminal, the method comprising receiving a command to grant permission to a second user to access a first user's file or folder, identifying a node managing the second user's user folder and sending a message to the node, the message including metadata for the file or folder.

According to an eighth aspect of certain embodiments of the present invention there is provided a method of operating a node for providing a file service to a mobile terminal, the method comprising receiving a message from another node granting permission to a second user to access a first user's file or folder and which includes metadata for the file or folder, and storing the metadata in metadatastorage.

According to a ninth aspect of certain embodiments of the present invention there is provided a computer-readable medium storing a computer program comprising instructions which, when executed by at least one computer causes the at least one computer to perform the method.

BRIEF DESCRIPTION OF THE DRAWINGS

Embodiments of the present invention will now be described, by way of example, with reference to the accompanying drawings in which.

DETAILED DESCRIPTION OF EMBODIMENTS

Figure 1:
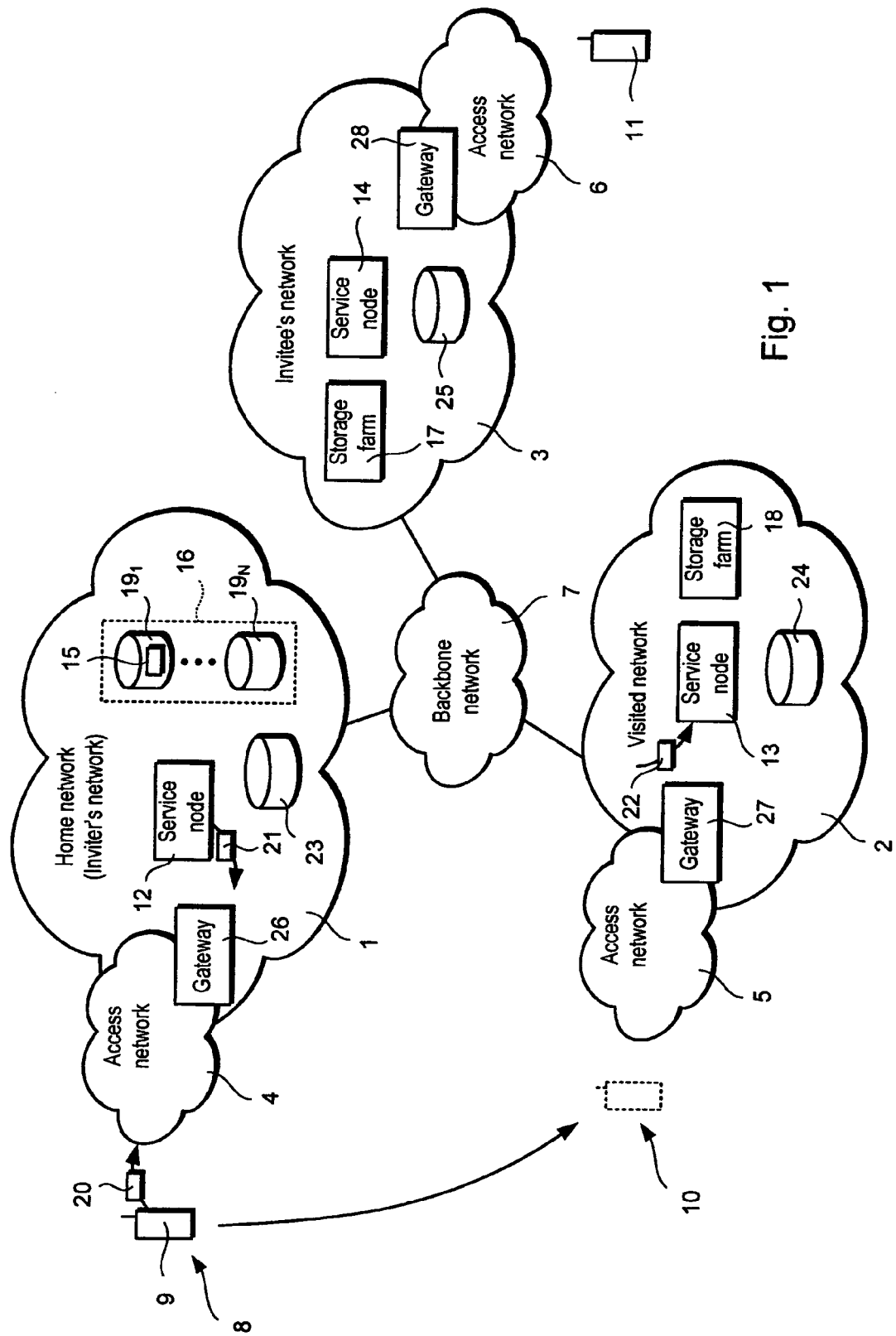
FIG. 1 shows a system of data networks accessible by mobile terminals.

Referring to FIG. 1, a system of data networks 1, 2, 3 in accordance with some embodiments of the present invention is shown. The data networks 1, 2, 3 are accessed via respective access networks 4, 5, 6 and interconnected by a backbone network 7.

In this example, the data networks 1, 2, 3 are General Packet Radio Services (GPRS) core networks and the access networks 4, 5, 6 are UMTS Terrestrial Radio Access Networks (UTRANs). However, the data networks 1, 2, 3 and access networks 4, 5, 6 need not be third-generation mobile telephone networks or even mobile telephone networks. For example, the access networks 4, 5, 6 (which can be unified with their respective data networks 1, 2, 3) can be wireless networks, for example conforming to IEEE 802.11, often referred to as a "wireless local area network" or WLAN, or IEEE 802.16, usually known as "WiMax", or even wired networks. Each data network 1, 2, 3 may be accessible via more than one access network (not shown) using different forms of connectivity. In this example, the data networks 1, 2, 3 are Internet Protocol (IP) networks, although they need not be IP networks.

The data networks 1, 2, 3 are controlled by different network operators (not shown) and serve different geographic regions. However, different networks 1, 2, 3 can serve the same region(s).

In a first location 8, a user (not shown) subscribes or is registered to use the first network 1 and is able to store and access data via the first network 1 (referred to as their "home" network) using a mobile terminal 9 (or "user equipment"). As will be explained in more detail later, in a second location 10, the user can also access their data via the second network 2 (referred to as their "visited" or "roamed" network). Furthermore, the user can also share their data with another user (not shown) through their corresponding terminal 11.

Each data network 1, 2, 3 includes at least one node 12, 13, 14 (hereinafter referred to as "service nodes") for providing a file service, for example providing access to the user's files 15, to mobile terminals 9, 11. Responsibility for the user's files 15 is taken by the node 12 in the user's home network 1 (hereinafter referred to as "the home node"). However, if there is more than one service node in the user's home network 1, then one of the service nodes is chosen to be the home node 12, for example, when the user first registers with the network 1.

Each data network 1, 2, 3 has a respective storage farm 16, 17, 18 each comprising at least one storage device $19_1, \ldots, 19_N$. Only storage devices $19_1, \ldots, 19_N$ for a first storage farm 16 are illustrated for clarity. If a home node 12 receives a request 20 from a subscriber to access their files 15 and the subscriber is located in their home network 1, then the home node 12 returns, to the mobile terminal 9, a metadata entry point 21 for accessing the files 15. However, if a different node 13 receives the request 20, e.g. because the subscriber is visiting the second network 2, then the node 13 identifies the home node 12, retrieves and caches metadata 22, and returns the metadata entry point 21 to the mobile terminal 9.

To help identify and/or authenticate mobile terminals 9, 11, the service nodes 12, 13, 14 may interrogate operator databases 23, 24, 25, such as home subscriber servers or user profile server.

As shown in FIG. 1, the service nodes 12, 13, 14 can be accessed via respective gateways 26, 27, 28.

Figure 2:
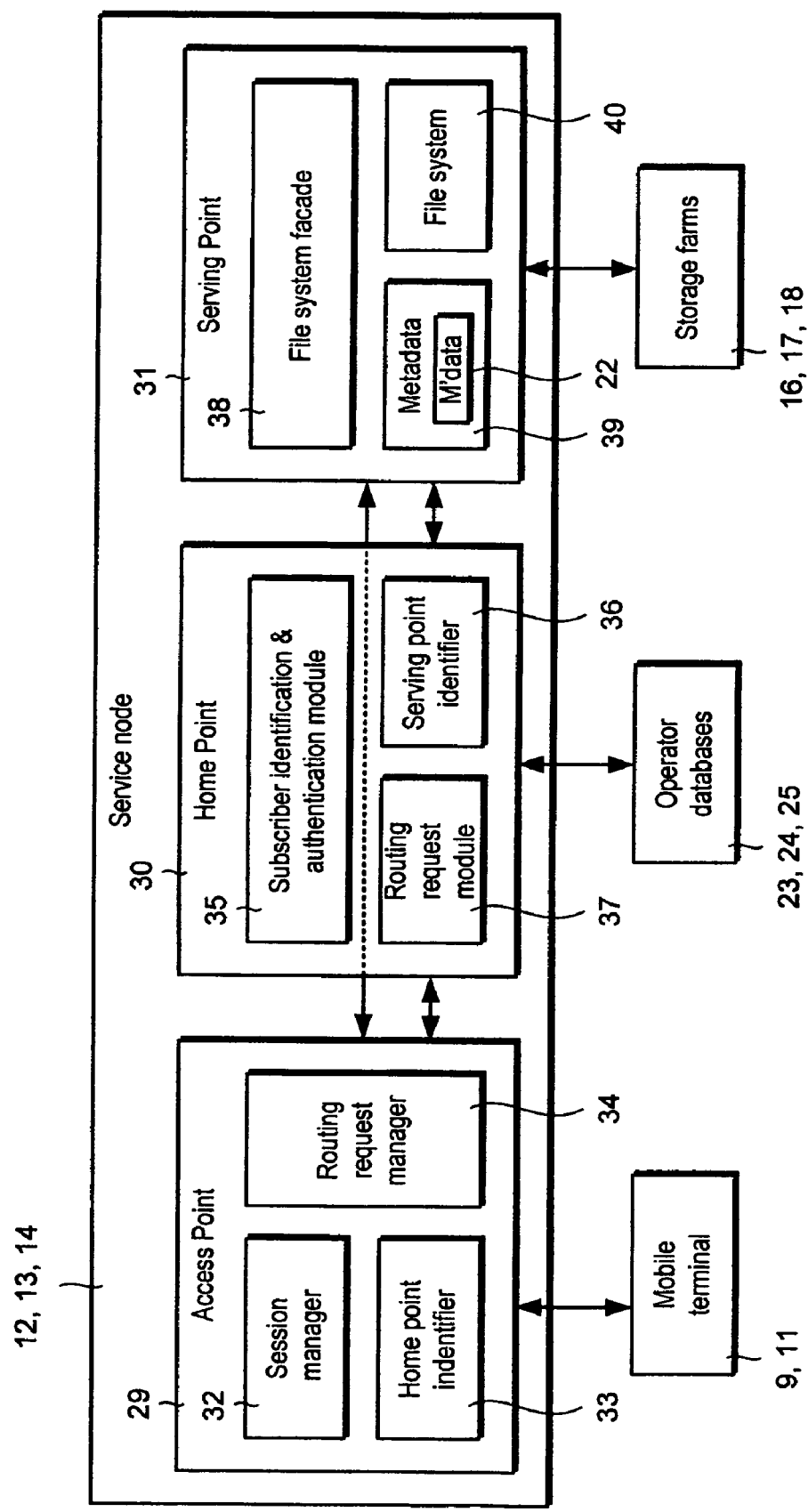
FIG. 2 is a functional block diagram of a node for providing a file service to mobile terminals.

Referring to FIG. 2, the service node 12, 13, 14 is shown in more detail.

The service nodes 12, 13, 14 are provided by servers 42 (FIG. 3) implemented in the network domain (i.e. ISO/OSI layer 3) with interfaces to the core network 1, 2, 3 (FIG. 1), storage pools 16, 17, 18 and operator databases 23, 24, 25. In this example, the service nodes 12, 13, 14 are neither part of the core network 1, 2, 3 (FIG. 1), nor sit on network elements (not shown), such as switches.

Each service node 12, 13, 14 interfaces with network elements through protocols, such as DIAMETER for interfacing with the operator's subscriber register 15, 16, 17, and session initiation protocol (SIP) for session initiation and control.

Each service node 12, 13, 14 includes an access function 29 (hereinafter referred to as the "access point"), a home network interfacing function 30 (hereinafter referred to as the "home point") and a file serving function 31 (hereinafter referred to simply as the "serving point"). A function may also be referred to as a "component" or "module".

The access point 29 includes a session manager 32, a home point identifier module 33 and a routing request manager 34.

The access point 29 is configured to manage sessions between the service node 12, 13, 14 and mobile terminals 9, 11, to identify the mobile terminal's home point 30 and to route messages between the mobile terminal 9, 11 and the home point 30 and the serving point 31, which may be attached to the same or a different node 12, 13, 14.

Requests from mobile terminal 9, 11 are directed to the access point 29 of the node 12, 13, 14 in the network 1, 2, 3 to which the mobile terminal 9, 11 is connected. Thus, taking the example of the first mobile terminal 9, if the mobile terminal 9 is connected to its home network 1 (FIG. 1), then it will connect to the access point 29 of the node 12 of its home network 1 (FIG. 1). If the mobile terminal 9 is connected to a visited network 2 (FIG. 1), then it will connect to the access point 29 of the node 13 of the visited network 2 (FIG. 1).

The node 12 in the subscriber's home network 1 (hereinafter referred to as the subscriber's "home node") and its corresponding home point 30 ("the subscriber's home point") is identified using the subscriber's network identifier, which in this example is in the form of a telephone number. However, the subscriber's network identifier may take other forms, such as data stored on a subscriber identity module (SIM) or data entered into the mobile terminal 9 by the user.

The subscriber's network identifier is used by the access point 29 to identify the subscriber's home network 1. A configuration of the home point 30 for the home network 1 is retrieved from a table (not shown) listing peer nodes 12, 13, 14, for example stored in each operator database 23, 24, 25 or in another database (not shown).

The access point 29 manages sessions and profiles by caching file system metadata and user information, including credential information and information about the configuration of the subscriber's home point 30.

A new session is established each time a client 51 (FIG. 4) is started on the mobile terminal 9. An existing session ends when the client 51 (FIG. 4) terminates, the session times out or a new session is established for the same network identifier.

The home point 30 includes a subscriber identification and authentication module 35, a home point identifier module 36 and a request routing module 37.

The home point 30 interfaces with the operator database 23, 24, 25 in its network 1, 2, 3 which stores subscription-related records (also referred to as "user profiles") and authentication and authorisation data.

The home point 30 also maps the subscriber's network identifier (e.g. telephone number) to the user's security identity in the serving point 31 of each network 1, 2, 3. The home point 30 stores a table including entries, each entry listing a network identity (herein also referred to as "NetworkID"), for example in the form of a country and area code, a user identity for example in the form of a telephone number (within given country and area) and a corresponding security identity (herein also referred to as a "SID"). The security identity is generated at a service node 12, 13, 14 where a file is hosted, which may be the user's service node or an inviter's service node.

The serving point 31 includes a file system facade 38 and stores metadata 39 (including user's meta data 22) and a file system 40.

The serving point 31 provides an interface with the network operator's file system 40 and respective storage farms 16, 17, 18. In this example, each storage farm 16, 17, 18 is located in its respective data network 1, 2, 3. For example, the storage farm 16, 17, 18 may be physically co-located with the service point 31. However, the storage farm 16, 17, 18 need not be located in the data network 1, 2, 3 and storage devices 19$_P$, ..., 19$_N$ providing the storage farm 16, 17, 18 may be distributed.

Figure 3:
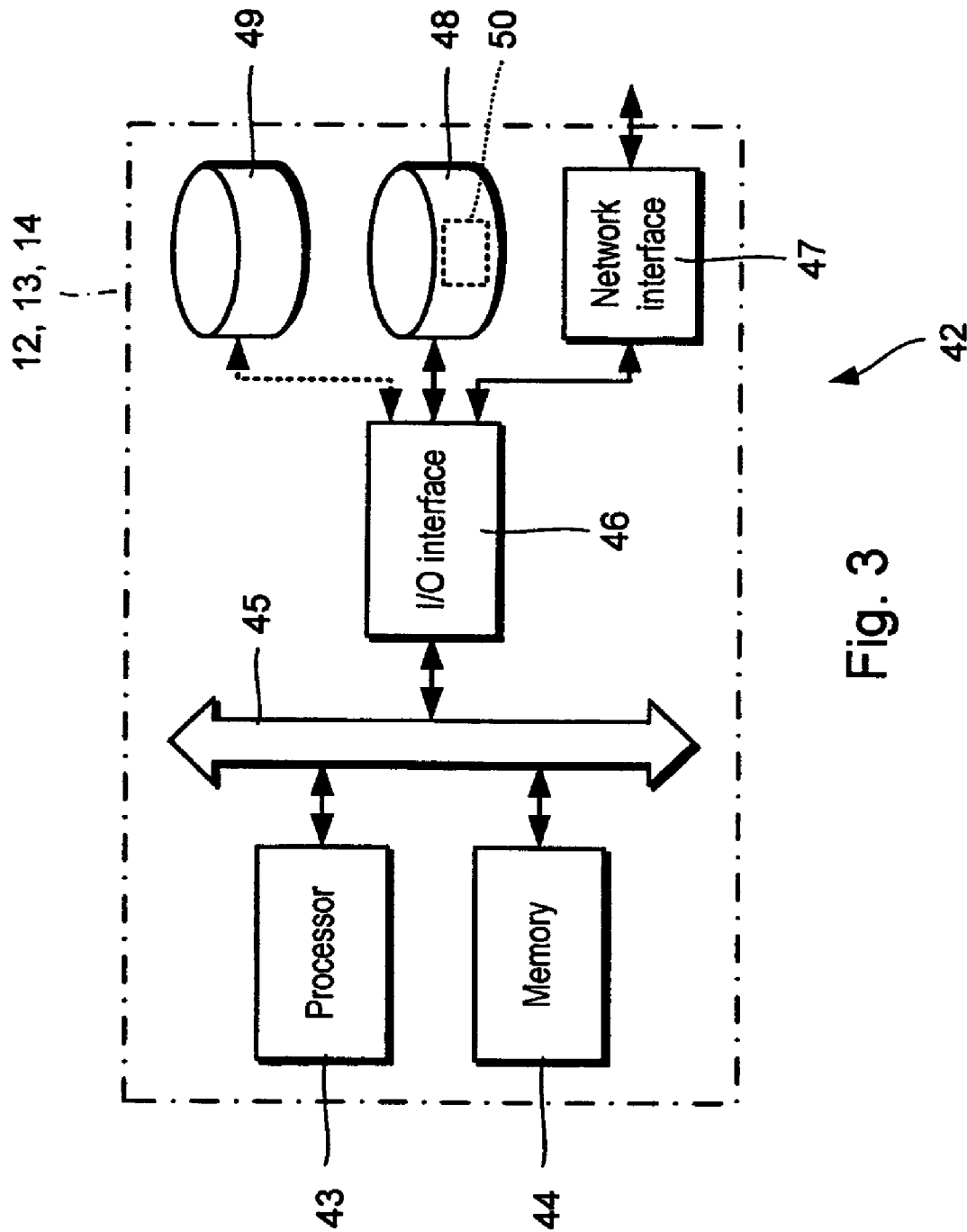
FIG. 3 is a block of a computer system for implementing at least some of the functions of the node shown in FIG. 2.

Referring to FIG. 3, the access point 29, home point 30 and serving point 31 are implemented by respective servers 42. However, more than one server 42 can be used to implement each component 29, 30, 31. In some embodiments, the servers are co-located. In other embodiments, the servers 42 are distributed.

Each server 42 includes a processor 43, memory 44 and an input/output (I/O) interface 45 operatively connected by a bus 46. A server 42 may include more than one processor. The I/O interface 45 is operatively connected to a network interface 47, storage 48 in the form of hard disc drives and, optionally, removable storage 49. Other elements, including peripheral devices such as keyboards (not shown) and displays (not shown), may be temporarily or permanently provided.

Respective computer program codes 50 which, when executed by a server 42, causes the server 42 to provide a components 29, 30, 31 are stored on a hard drive 48 and loaded into memory 44 for execution by the processor 43. The computer program codes 50 may be stored on and transferred from removable storage 49 or through network interface 47 from a remote source (not shown).

Figure 4:
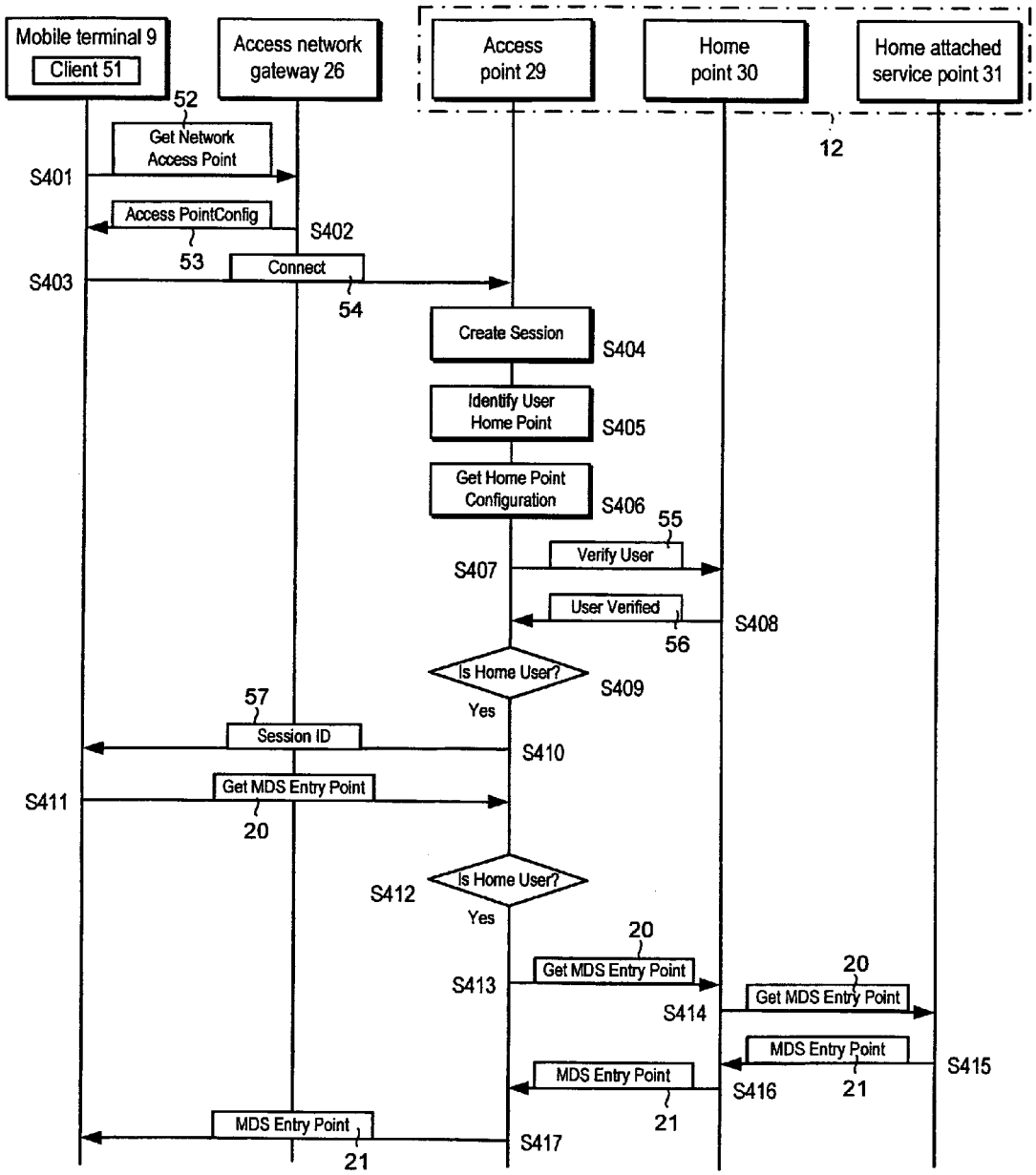
FIG. 4 is a sequence flow diagram illustrating a method of discovering a node in a home network.

Referring to FIGS. 1, 2 and 4, a method of discovering a service node 12 in a home network 1 will now be described, in which a mobile terminal 9 contacts its home operator's service node 12 and creates a session which enables the user to proceed with file and folder operations, such as storing, updating and reading files.

The user starts a client 51 on their mobile terminal 9. If not already connected to the data network 1, the client 51 automatically (e.g. without further user instruction) causes the mobile terminal 9 to establish a connection with the data network 1.

The client 51 sends a query 52 to the gateway 26 asking for availability and an address of the network's access point 29 (step S401). The gateway 26 returns a message 53 which includes the address (e.g. an access point name or an IP address) of the network's access point 29 (step S402) and the client 51 sends a request 54 to the identified access point 29 to be connected thereto (step S403).

The access point 29 creates a session (step S404), identifies the home point 30 of the home node 12 (i.e. the "user's home point") (step S405) and retrieves an access address of the user's home point 30 (step S406).

The access point 29 contacts the user's home point 30 and sends a request 55 to authenticate the user (step S407). The request 55 identifies the user using a network identity (e.g. country and area codes) and a user identity (e.g. telephone number). The user's home point 30 returns a message 56 verifying (or not) that the user is authenticated (step S408). The verifying message 56 includes a security identifier for the file system 40. If the user is authenticated, then the process continues, otherwise it terminates.

The access point 29 determines whether the user is camped in their home network (i.e. whether the service node 12 is the user's home node) (step S409). If the service node 12 is the user's home node, then the access point 29 sends a message 57 to inform the client 51 that it is connected and identifies the session (step S410). In the event that the service node 12 is not the user's home node (i.e. that the user's home point is provided by a different service node 13, 14), the access node 29 responds differently and the response is described hereinafter with reference to FIG. 6.

The client 51 sends a request 20 to the access point 29 for the user's entry point of metadata (step S411). The request 20, which may be referred to as a "call function", can specify whether an entry point to a root folder or a specific folder is required. For example, a request "GetMDSEntryPoint( )" can be used to ascertain the entry point to the root folder. Alternatively, a request "GetMDSEntryPoint(EntityID)" can be used to find entry point for a folder specified by the argument, namely EntityID. If the client 51 knows the EntityID for the root folder, then GetMDSEntryPoint(EntityID) can be used to find the entry point for the root folder. As will be described in more detail later, the entry point metadata 21 describes a folder and its content. The access node 29 checks whether the user is in its home network (step S412). If the user is in its home network, then the access node 29 sends a request 20 to the home point 30 requesting the user's entry point of metadata (step S413). The request 20 is forwarded to the serving point 31 (step S414). The serving point 31 retrieves the user's metadata entry point 21 from metadata 39 (FIG. 2) and returns the metadata entry point 21 to the home point 30 (step S415), which in turn forwards it to the access point 29 (step S416). The access point 29 forwards the metadata entry point 29 to the client 51 (step S417).

The user's metadata entry point 21 is stored locally (i.e. in the mobile terminal 9) until a predefined event or timeout occurs. Using the metadata entry point 21, the user is able to proceed with other operations, such as uploading, downloading, sharing or changing the file and folder attributes.

Figure 5:
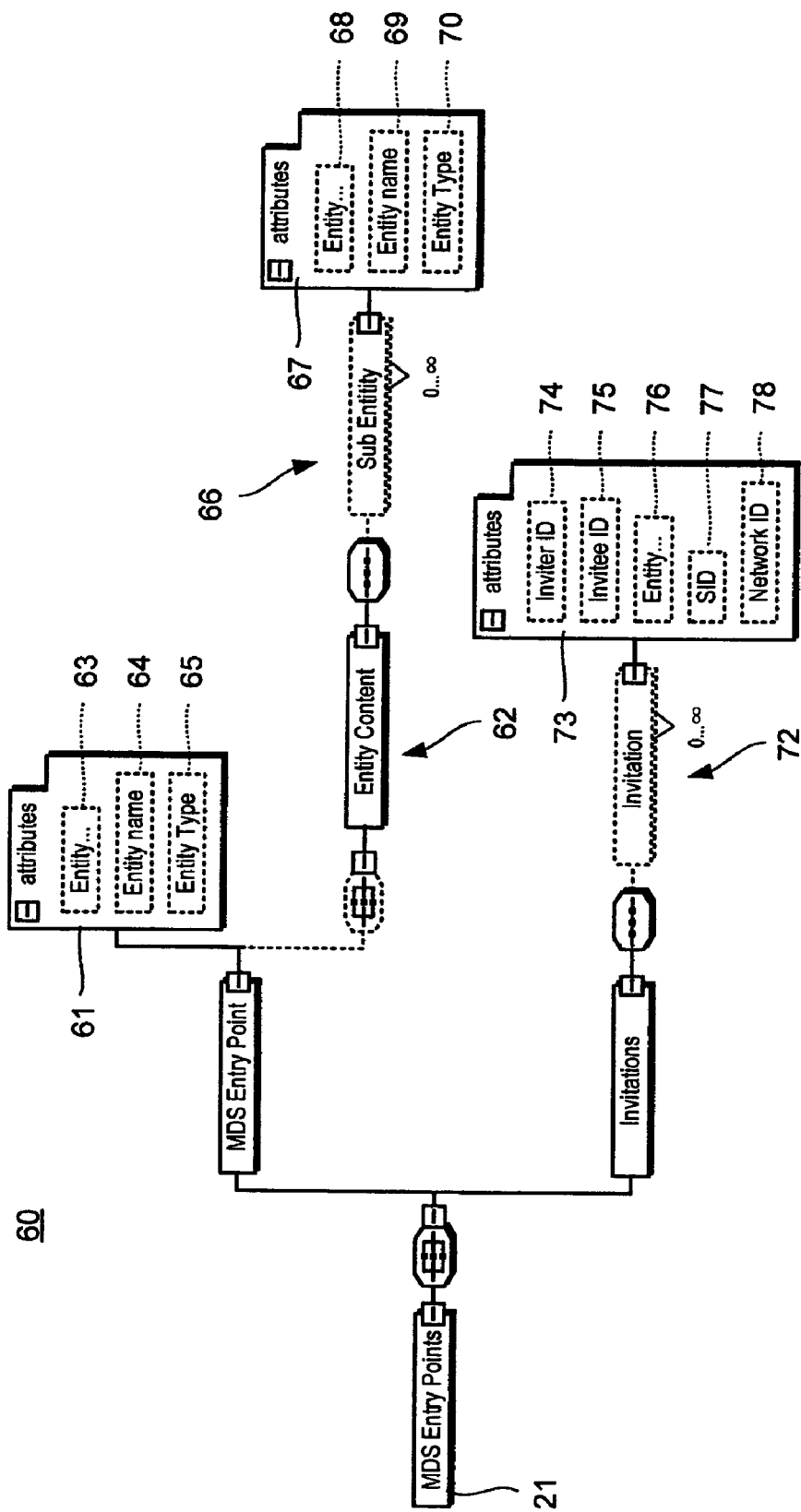
FIG. 5 illustrates structure of metadata entry point.

Referring to FIG. 5, the structure 60 of the metadata entry point 21 is shown in the form of an XML schema diagram.

A metadata entry point 21 includes information 61 about a folder (e.g. a root folder) and information 62 about its content.

The folder information 61 may include an entity identifier 63 (herein also referred to as "EntityID"), an entity name 64 and an entity type 65.

Likewise, the content information 62 may include information 66 about each entity in the form of a set of attributes 67 which may include an entity identity 68, an entity name 69 and an entity type 70. The entity may be a file or a folder. The entity identity 68 can be used by a client 51 in subsequent requests for information about sub-directories.

The metadata entry point 21 for a root folder may also include invitations 72 from other users to access files. Each invitation 72 includes information 73 about the file or folder that the user has been invited to access and includes an inviter identity 74, an invitee identity 75, an entity identity 76, a security identity 77 and a network identity 78.

An example of a metadata entry point 21 for a root folder conforming to the structure 60 shown in FIG. 5 is given below:

```
<MDSEntryPoints >
    <MDSEntryPoint EntityID="5" EntityName="John Root"
    EntityType="Folder">
        <EntityContent>
```

-continued

```
            <SubEntity EntityID="7" EntityType="Folder"
            EntityName="My Documents"/>
            <SubEntity EntityID="6" EntityType="File"
            EntityName="picture.jpg"/>
        </EntityContent>
    </MDSEntryPoint>
    <Invititions>
        <Invitation EntityID="201" InviteeID="6192244"
    InviterID="437981" NetworkID="441234" SID="31" />
    </Invititions>
</MDSEntryPoints>
```

The root folder is called "John Root" and is identified in the file system by an EntityID "5". The root folder contains a folder called "My Documents" and a file called "picture.jpg" identified by EntityIDs "7" and "6" respectively.

The root folder also includes an invitation from another user to access a folder (not shown). The invitation does not specify the name of the folder. However, the invitation identifies the file in the inviter's file system using an EntityID and a SID assigned by the inviter's service node and identifies the inviter's network using an inviter's network ID, in this case, using country and area codes, and the inviter's user ID, in this example, using a telephone number within the network (i.e. excluding any county and area codes). The invitation also specifies the invitee, in this instance, using the invitee's telephone number within the network.

It will be appreciated that the example just given is simplified and that a metadata entry point 21 may contain many more sub-entities.

A metadata structure is a whole set of ordered data organized in a parent-child hierarchy in which each element contains information about its own and its underlying name, type, structure, contents, and invitation characteristics.

A metadata entry point is a subset of a metadata structure which only contains information about a particular entry point and its underlying files and folders, with no further information about other elements in the hierarchy and no information about the contents of its subfolders. Hence, the entry point represents a peek into a certain point in the metadata structure.

As will be explained in more detail later, in certain circumstances, initial queries are for the metadata structure so as to cache the whole structure in a visited network and, thus, minimize traffic. Subsequent queries are for entry points in the cached metadata structure. Therefore, most of the user's requests are querying for entry points.

Below is an illustration in XML notation of a metadata structure and a certain metadata entry point in that metadata structure:

```
<MDS >
    <Invititions>
        <Invitation EntityID="201" InviteeID="6192244" InviterID="437979"
    NetworkID="441223" SID="31"/>
    </Invititions>
    <Entity EntityID="5" EntityName="John Root" EntityType="Folder">
        <EntityContent>
            <Entity EntityID="7" EntityName="My Documents" EntityType="Folder">
                <EntityContent>
                    <Entity EntityID="14" EntityName="Work Related" EntityType="Folder">
                        <EntityContent>
                            <Entity EntityID="63" EntityName="Proposals" EntityType="Folder"/>
                            <Entity EntityID="112" EntityName="BusinessPlan.doc" EntityType="File"/>
```

```
                </EntityContent>
            </Entity>
            <Entity EntityID="17" EntityName="Entertainment" EntityType="Folder">
                <EntityContent>
                    <Entity EntityID="211" EntityName="MJ.avi" EntityType="File"/>
                </EntityContent>
            </Entity>
            <Entity EntityID="72" EntityName="pim.db" EntityType="File"/>
        </EntityContent>
    </Entity>
    <Entity EntityID="6" EntityName="Picture.jpg" EntityType="File"/>
    </EntityContent>
</Entity>
</MDS>
<MDSEntryPoints >
    <MDSEntryPoint EntityID="5" EntityName="John Root" EntityType="Folder">
        <EntityContent>
            <SubEntity EntityID="7" EntityType="Folder" EntityName="My Documents"/>
            <SubEntity EntityID="6" EntityType="File" EntityName="picture.jpg"/>
        </EntityContent>
    </MDSEntryPoint>
    <Invititions>
        <Invitation EntityID="201" InviteeID="6192244" InviterID="437981" NetworkID="441234" SID="31" />
```

Referring again to FIG. 4, once a client 51 has sent a request 20 for an entry point to the user's root folder, e.g. using GetMDSEntryPoint( ), and received a metadata entry point 21 for the root folder, then the client 51 can send further requests 20 for an entry point to sub-folders, e.g. using GetMDSEntryPoint(EntityID).

Figure 6:
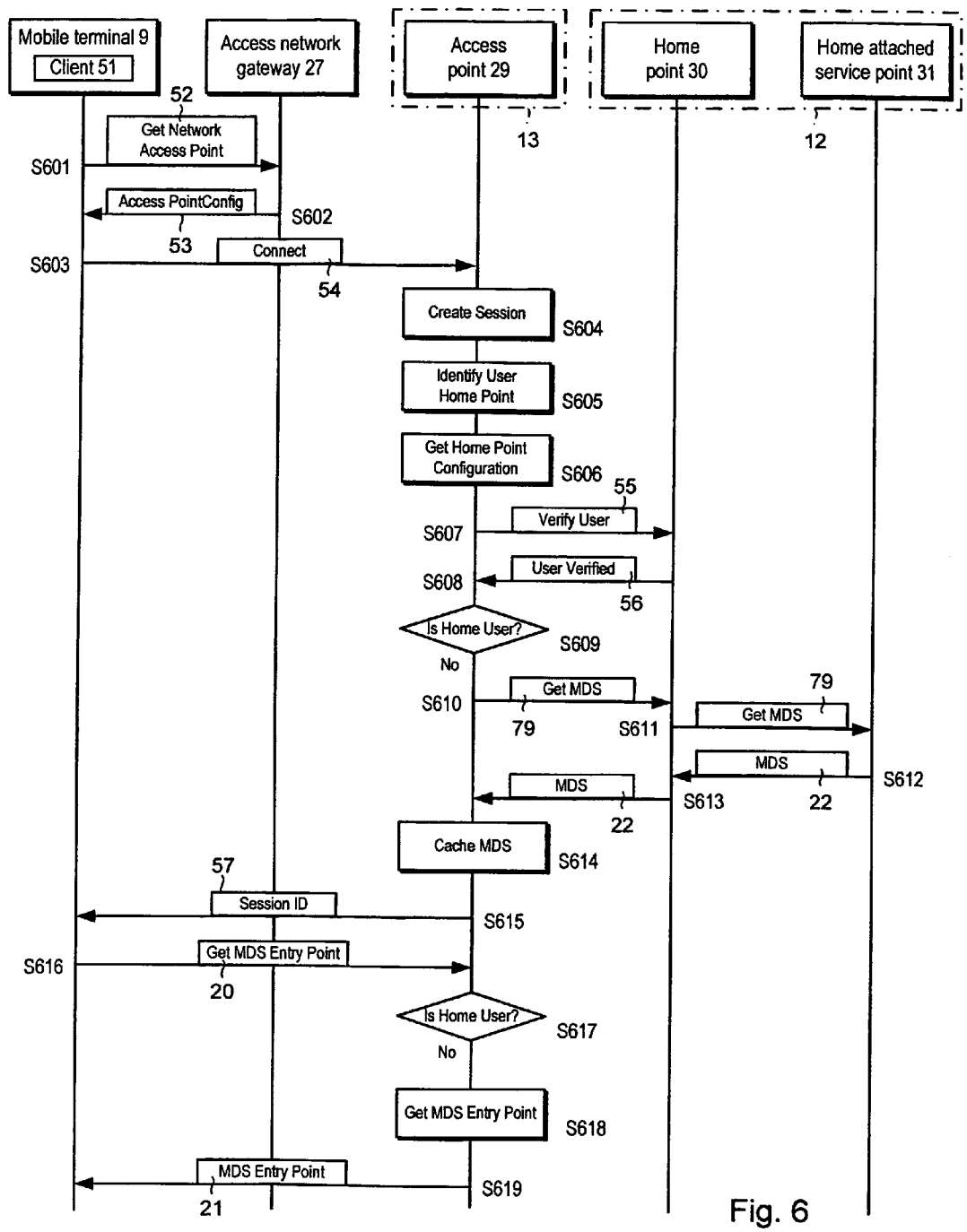
FIG. 6 is a sequence flow diagram illustrating a method of discovering a node in a visited network.

Referring to FIGS. 1, 2 and 6, a method of discovering a service node 13 in a visited network 2 will now be described, in which a user wishes to access files and folders in their home network 1.

The user starts a client 51 on their mobile terminal 9. If not already connected to the data network 2, the client 51 automatically (e.g. without further user instruction) causes the mobile terminal 9 to establish a connection with the data network 2.

The client 51 sends a query 52 to a gateway 27 asking for availability and an address of the network's access point 19 and requests connection in the same way as steps S401 to 403 hereinbefore described (steps S603). The access point 29 of the visited service node 13 creates a session (step S604), identifies the home point 30 of the home node 12 (i.e. the "user's home point") (step S605) and retrieves an access address of the user's home point 30 (step S606) in the same way as steps S604 to 606 hereinbefore described. Also, the access point 29 may contact the user's home point 30 (step S607) and send a request 55 to authenticate the user, to which the user's home point 30 returns a message 56 verifying (or not) that the user is authenticated and, if authenticated, the security identity (step S608).

The access point 29 determines whether the network 2 is home to the user or whether the user is visiting (step S609). If the service node 13 is visiting, then the access point 29 sends a request 79 to the user's home node to be sent metadata 22 (step S610).

The home point 30 at the user's home node 12 forwards the request 79 to the service point 31 (step S611).

The service point 31 returns metadata 21 for the user to the home point 30 (step S612), which in turn forwards the metadata 22 to the access point 29 (step S613). The metadata 22 describes the user's file structure including a top-level folder and sub-folders, and files therein.

The access point 29 caches the metadata 22 locally (step S614). The access point 29 sends a message 57 to inform the client 51 that it is connected and identifies the session (step S616).

The client 51 sends a request 20 to the access point 29 for the user's metadata entry point 21 (step S617). The access node 29 checks whether the user is in its home network (step S618). If the user is visiting, then the access node 29 retrieves the user's metadata entry point 21 stored locally and returns the metadata entry point 21 to the client 51 (step S619).

Using the metadata entry point 21, even though they are located in a visited network 2, the user is able to proceed with other operations, such as uploading, downloading, sharing or changing the file and folder attributes in the same way that they could in their home network 1.

Figure 7:
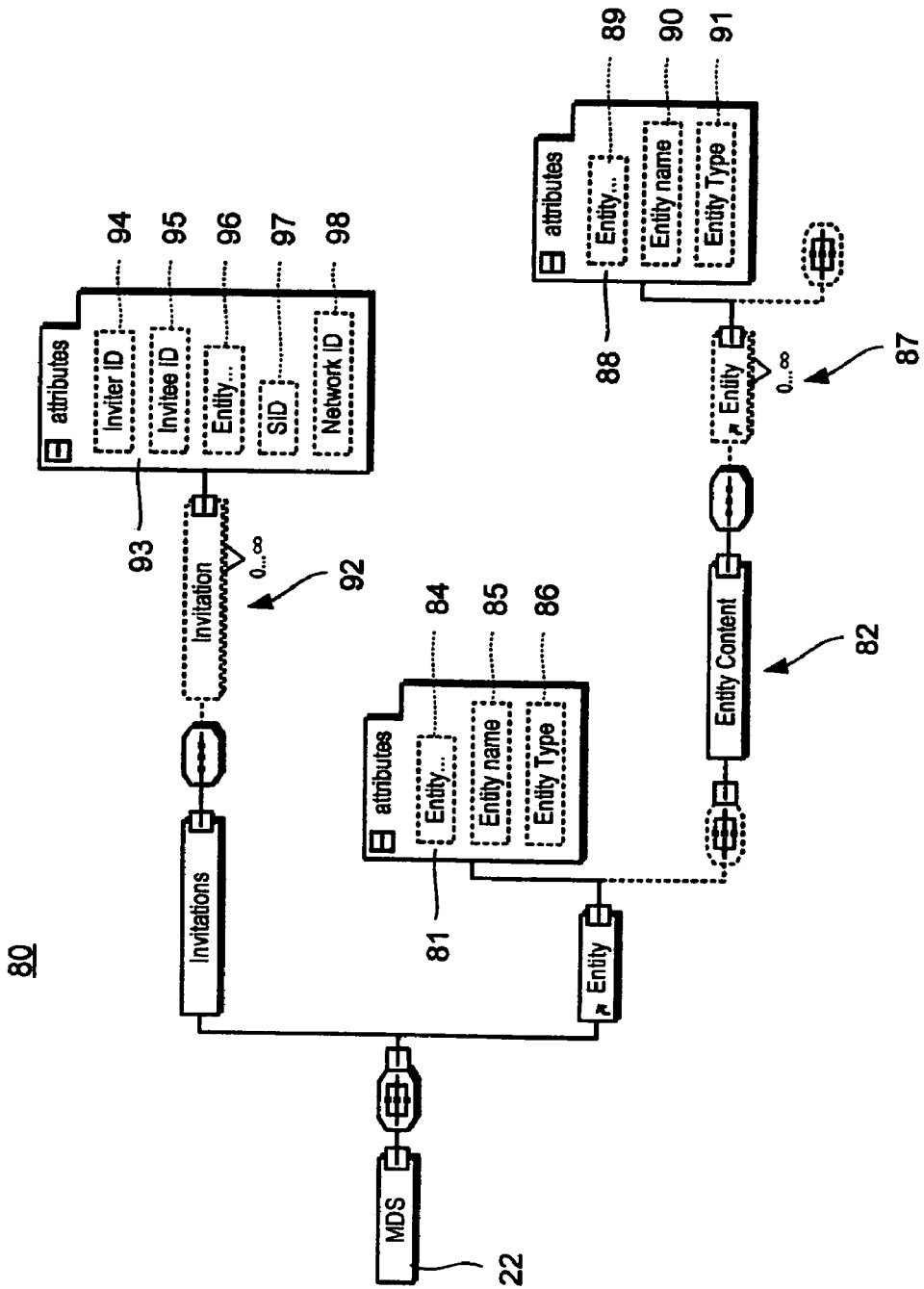
FIG. 7 illustrates structure of metadata.

Referring to FIG. 7, the structure 80 of the metadata 22 is shown.

Metadata 22 includes information 81 about the user's folder and information 82 about its content, i.e. each entity, such as a file or folder.

The folder information 82 includes an entity identifier 84, an entity name 85 and an entity type 86.

The content information 82 includes information 87 about each entity including a set of attributes 88 which may include an entity identity 89, an entity name 90 and an entity type 91. The entity may be a file or a folder.

The metadata 22 includes invitations 92 (if any) from other users to access files.

Each invitation 92 includes information 93 about the folder or file that the user has been invited to accesses and includes an inviter identity 94, an invitee identity 95, an entity 96, a security identity 97 and a network identity 98.

Once a user has discovered their local service node 12, 13, 14, they can carry out several file and folder operations, such as storing files, and this is hereinafter described in more detail. Furthermore, the user can share their files and folders with other users from the same or different network 1, 2, 3 or share files and folders of other users.

Figures 8, 9:
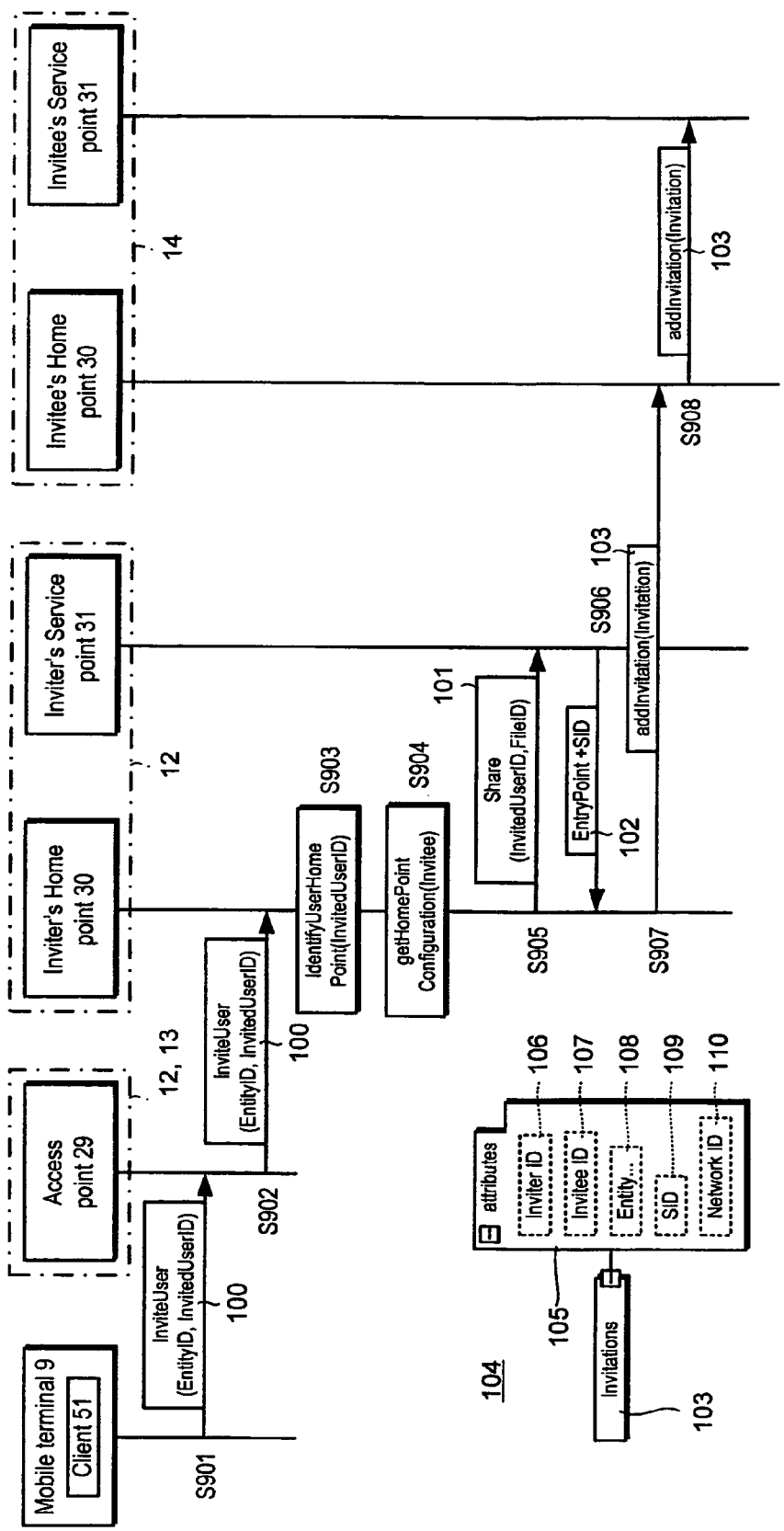
FIG. 8 is a sequence flow diagram illustrating a method of sending an invitation to share a file.
FIG. 9 illustrates structure of the invitation sent in the method described with reference to FIG. 7.

Referring to FIGS. 1, 2 and 8, a method of sending an invitation from a user ("the inviter") to another user ("the invitee") to view or share a file will now be described. The access network gateway is omitted for clarity.

The client 51 (of the inviter's mobile terminal 9) establishes a connection with a service node 12, 13, as hereinbefore described.

The client 51 sends an invitation 100 to share a file to the access point 29 (step S901). The invitation 100 specifies a user identity of the invitee (e.g. the telephone number of a mobile terminal 11) and a file identity of the file or folder to be shared.

The access point 29 forwards the invitation 100 to the inviter's home point 30 (step S902). The inviter's home point 30 identifies the invitee's home point 30 (step S903) and retrieves the configuration for the invitee's home point 30 (step S904).

The inviter's home point 30 sends an instruction 101 to the inviter's service point 31 to share the specified file or folder (step S905). The inviter's service point 21 returns a message 102 to the inviter's home point 30 which specifies a metadata entry point and a security identity (step S906). The inviter's home point 30 also sends an invitation 103 to the invitee's home point 30 notifying it that the invitee is invited to share the specified file or folder (step S907). The invitee's home point 30 forwards the invitation 103 to the invitee's service point, which in turn updates invitee's metadata to indicate that a shared file (step S908).

Referring to FIG. 9, the structure 104 of the invitation 103 is shown in more detail.

Each invitation 103 has a set of attributes 105 which includes an inviter identity 106, an invitee identity 107, an entity identifier 108, a security identity 109 and a network identity 110. The network identity 110 is specified to avoid generating multiple security identities 109 for a given invitee.

Figure 10:
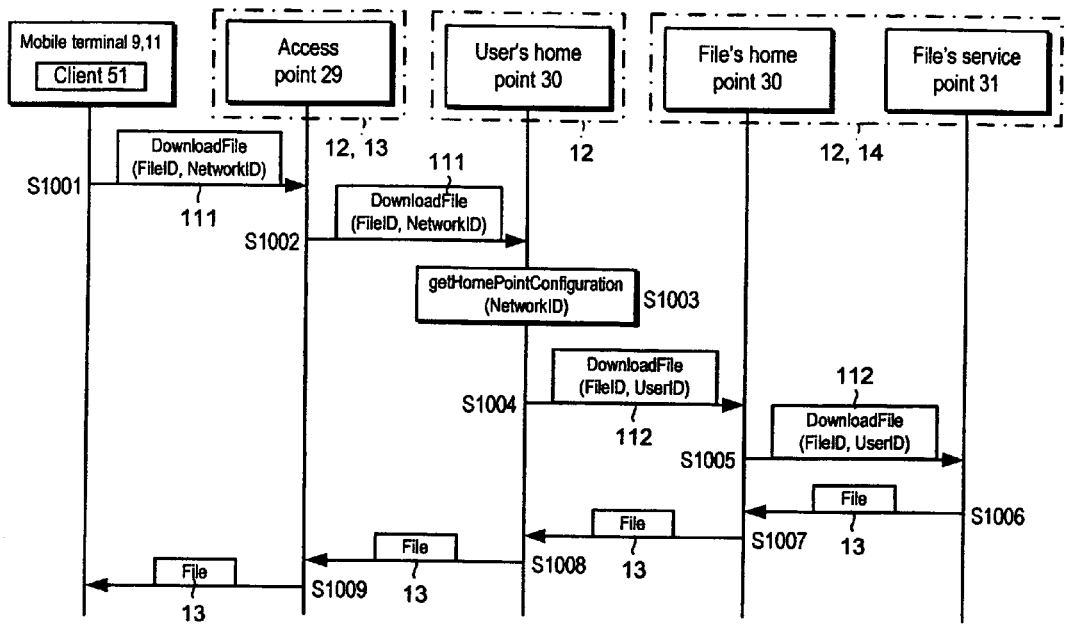
FIG. 10 is a sequence flow diagram illustrating a method of downloading a file.

Referring to FIGS. 1, 2 and 10, a method of downloading a file will now be described, in which a user downloads a file from a so-called "file home point" which may be the user's home point 12 or the inviter's home point 14.

The client 51 (which may be running on the first or second mobile terminal 9, 11) establishes a connection with a service node 12, 13, 14 as hereinbefore described.

The client 51 sends a request 111 to the access point 29, which may be in a home network 1 or a visited network 2 (step S1001). The request specifies a file identity and a network identity which identifies the network 1, 2, 3 in which the file is stored. Thus, if the user wishes to download their own file(s), then the network identity specifies, in the case of first mobile terminal 9, the first data network 1 or, in the case of the second mobile terminal 11, the third data network 3. If, however, the user wishes to download shared file(s), then the network identity specifies, in the case of second mobile terminal 11, the first data network 1.

The access point 29 forwards the request 111 to the user's home point 30 (step S1002). The home point 30 checks if the file is located in the attached service point 31 (step S1003).

The home point 30 sends a request 112 to the service point 31 to return the specified file(s) 13 (steps S1004 & S1005). In the case where the file is not located in the attached service point 31, the request 103 is sent via the invitee's home point 30.

The service point 31 returns the specified file(s) 13 to the user's home point 30 (steps S1006 & S1007), which in turn forwards the file(s) to the mobile terminal 9 (steps S108 & 1009).

Figure 11:
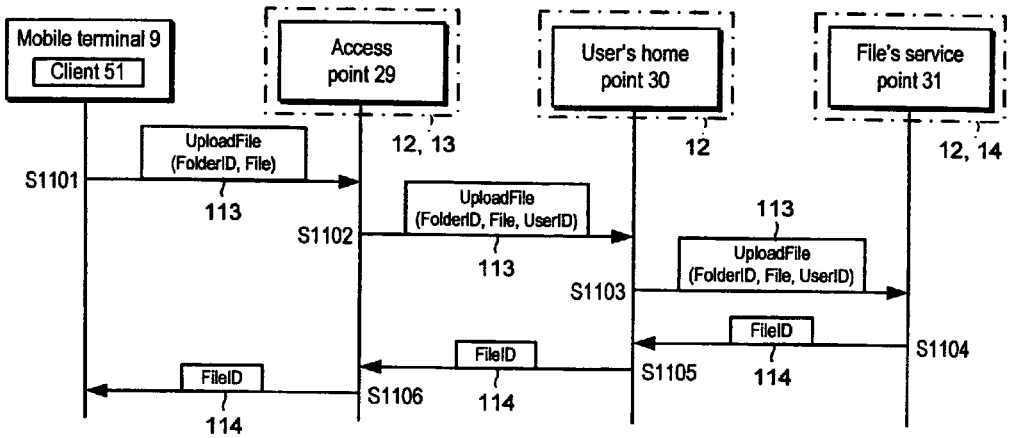
FIG. 11 is a sequence flow diagram illustrating a method of uploading a file.

Referring to FIG. 11, a method of uploading a file will now be described, in which a user uploads a file from their mobile terminal 9 to their home point 12. In this example, the user can only upload a file to their folder and not to a folder belonging to another user. Thus, the "file home point" is the user's home point 12. The access network gateway is omitted for clarity.

The client 51 establishes a connection with a home node 12, 13, 14, as hereinbefore described.

The client 51 sends a request 113 to the access point 29, which may be in a home network 1 or a visited network 2 (step S1101). The request 113 specifies a folder identity and the file.

The access point 29 forwards the request 113 to the user's home point 30 (step S1102). The home point 30 forwards the request 113 to the file service point 30, in this case, the service point 30 of the user's home point 12 (step S1103).

The file service point 30 returns a file identity 114 to the home point 30 which updates the metadata (step S1104) and forwards the file identity 109 to the mobile terminal 9.

It will be appreciated that many modifications may be made to the embodiments hereinbefore described. For example, file services may be accessible through the Internet. Each node can be used to provide a file service to a plurality of different mobile terminals. File services may overlap. For example more than two users may be invited to access the same file(s). Furthermore, users can exchange invitations. For example, a user may invite another to access one or more of their files and vice versa.

The invention claimed is:

1. A node for providing a file service to a mobile terminal, the node comprising:
    memory;
    a network interface,
    at least one processor in communication with the memory and the network interface, the at least one processor configured to provide:
    a system for managing files for a plurality of users, each user having a user folder, and
    at least one processing module,
    the at least one processing module configured, in response to receiving a request for connection to the node from a mobile terminal having a home node to identify the mobile terminal, and to determine whether the node is the home node of the mobile terminal; and the at least one processing module also configured, in response to receiving a request to access the user folder from the mobile terminal and in dependence upon the node being the home node of the mobile terminal, to retrieve an entry point for the user folder, the entry point comprising information about the user folder and about content of the user folder, and to transmit the entry point to the mobile terminal.

2. A node according to claim 1, further comprising storage for storing metadata for the file system, wherein the at least one processing module is configured to retrieve the entry point from the metadata.

3. A node according to claim 1, wherein the at least one processing module is configured, in response to determining that the file managing system does not manage the user folder, to identify another node which manages the user folder, to request metadata for the user folder from the other node, to receive the metadata from the other node, to retrieve the entry point from the metadata and to transmit the entry point to the mobile terminal.

4. A node according to claim 3, comprising storage for storing metadata, wherein the at least one processing module is configured to store received metadata in the metadata storage for at least a predetermined duration of time.

5. A node according to claim 1, wherein the at least one processing module is configured to identify a user from the request and, in dependence upon a user identity, to identify the user folder.

6. A node according to claim 1, the at least one processing module is configured, in response to receiving a command to grant permission to a second user to access a first user's file or folder, to identify a node managing the second user's user folder and to send a message to the node, the message including metadata for the file or folder.

7. A node according to claim 1, further comprising storage for storing metadata for the file system, wherein the at least one processing module is configured, in response to receiving a message from another node granting permission to the user to access another user's file or folder and which includes metadata for the file or folder, to stored the metadata in the metadata storage.

8. A node according to claim 1, wherein the at least one processing module is configured to inspect a network identifier provided by the mobile terminal so as to determine whether the file managing system manages the user folder.

9. A node according to claim 1, wherein the entry point comprises a security identifier.

10. A node according to claim 1, wherein the at least one processing module is configured, in response to receiving a request for file access from a mobile terminal, to authenticate the mobile terminal.

11. A system for serving a file comprising:
a node; for providing a file service to a mobile terminal, the node comprising:
memory;
a network interface,
at least one processor in communication with the memory and the network interface, the
at least one processor configured to provide:
a system for managing files for a plurality of users, each user having a
user folder, and at least one processing module,
the at least one processing module configured, in response to receiving a request for connection to the node from a mobile terminal having a home node: to identify the mobile terminal, and to determine whether the file managing system manages the user folder for the mobile terminal such that the node is the home node of the mobile terminal;
the at least one processing module also configured, in response to receiving a request for access to the user folder from the mobile terminal and in dependence upon the node being the home node of the mobile terminal: to retrieve an entry point for the user folder, the entry point comprising information about the user folder and about content of the user folder, and to transmit the entry point to the mobile terminal; and
storage, remotely located from the node, for storing the files.

12. A communications network including a file serving system comprising
a node for providing a file service to a mobile terminal, the node comprising memory;
a network interface,
at least one processor in communication with the memory and the network interface; the at least one processor configured to provide:
a system for managing files for a plurality of users, each user having a user folder storage, remotely located from the node, for storing the files, and at least one processing module,
the at least one processing module configured, in response to receiving a request for connection to the node from a mobile terminal having a home node: to identify the mobile terminal, and to determine whether the file managing system manages the user folder for the mobile terminal such that the node is the home node of the mobile terminal;
the at least one processing module also configured, in response to receiving a request for access to the user folder from the mobile terminal and in dependence upon the node being the home node of the mobile terminal: to retrieve an entry point for the user folder, the entry point comprising information about the user folder and about content of the user folder, and to transmit the entry point to the mobile terminal; and
storage, remotely located from the node, for storing the files.

13. A communications network according to claim 12, including at least one access point configured, in response to receiving a request for connection to a node from a mobile terminal, to return an address for the node to the mobile terminal.

14. A method of operating a node for providing a file service to a mobile terminal, the method comprising:
receiving a request for connection to the node from a mobile terminal having a home node;
in response to receiving the request for connection to the node, identifying the mobile terminal;
determining whether the node manages a user folder for the mobile terminal such that the node is the home node of the mobile terminal;
receiving a request to access the user folder from the mobile terminal;
in response to receiving the request to access the user folder from the mobile terminal and in dependence upon the node being the home node of the mobile terminal, retrieving an entry point for the user folder comprising information about the user folder and about content of the user folder; and
transmitting the entry point to the mobile terminal.

15. A method according to claim 14, further comprising:
identifying another node which manages the user folder,
requesting the metadata for the user folder from the other node,
receiving the metadata from the other node;
retrieving the entry point from the metadata.

16. A computer-readable medium storing a computer program comprising instructions which, when executed by at least one computer, causes the at least one computer to perform a method of operating a node for providing a file service to a mobile terminal, the method comprising:
receiving a request for connection to the node from a mobile terminal having a home node;
in response to receiving the request for connection to the node, identifying the mobile terminal;
determining whether the node manages a user folder for the mobile terminal such that the node is the home node of the mobile terminal;
receiving a request to access the user folder from the mobile terminal;
in response to receiving the request to access the user folder from the mobile terminal and in dependence upon the node being the home node of the mobile terminal, retrieving an entry point for the user folder comprising information about the user folder and about content of the user folder; and
transmitting the entry point to the mobile terminal.

17. The computer-readable medium of claim 16, wherein the method further comprises:
requesting the metadata for the user folder from the other node,
receiving the metadata from the other node;
retrieving the entry point from the metadata.

* * * * *